United States Patent [19]

Lödige et al.

[11] 4,117,223

[45] Sep. 26, 1978

[54] PROCESS FOR THE PREPARATION OF CELLULOSE ALKYL ETHERS

[76] Inventors: Wilhelm Lödige, Elsenerstr. 9c; Fritz Lödige, Leuschnerstr. 12; Josef Lücke, Im Lohfeld 15; Eberhard Lipp, Habichtsweb 2, all of 4790 Paderborn, Fed. Rep. of Germany

[21] Appl. No.: 821,134

[22] Filed: Aug. 2, 1977

[30] Foreign Application Priority Data

Aug. 6, 1976 [DE] Fed. Rep. of Germany ....... 2635403

[51] Int. Cl.$^2$ .............................................. C08B 11/02
[52] U.S. Cl. ....................................... 536/99; 536/100
[58] Field of Search ..................... 536/99, 100, 101, 84

[56] References Cited

U.S. PATENT DOCUMENTS

| | | | |
|---|---|---|---|
| 1,464,158 | 8/1923 | Seel | 536/100 |
| 1,504,178 | 8/1924 | Young | 536/99 |
| 1,704,304 | 3/1929 | Sessler | 536/99 |
| 1,858,017 | 5/1932 | Lilienfeld | 536/99 |
| 1,858,018 | 5/1932 | Lilienfeld | 536/99 |

FOREIGN PATENT DOCUMENTS

| | | |
|---|---|---|
| 1,218,766 | 5/1960 | France. |
| 1,061,766 | 7/1959 | Fed. Rep. of Germany. |
| 729,823 | 5/1955 | United Kingdom ..................... 536/101 |
| 778,732 | 7/1957 | United Kingdom ..................... 536/100 |
| 864,766 | 4/1961 | United Kingdom ..................... 536/99 |

*Primary Examiner*—Ronald W. Griffin
*Attorney, Agent, or Firm*—McNenny, Pearne, Gordon, Gail, Dickinson & Schiller

[57] ABSTRACT

The present invention is related to a new process for producing cellulose $C_1$–$C_4$-alkyl ethers by subjecting cellulose to reaction with an alkali metal hydroxide and subjecting the resulting alkali metal salt of cellulose to reaction with an alkyl halide wherein the alkyl group contains 1 to 4 carbon atoms. The new process is characterized by subjecting 1 part by weight of cellulose to reaction with 0.5 to 4 parts by weight of the alkyl halide in a positive mixer having a fast-running mixing appliance and a container with adjustable internal pressure and cooling of the internal container wall, adding the alkali metal hydroxide in a concentrated aqueous solution or in a substantially water-free and finely divided state, and adjusting the pressure in the reaction vessel with cooling in such a way that the temperature of the reaction mixture remains in the range of from 15° to 40° C., and raising the temperature of the reaction mixture after termination of the alkalization to from 50° to 100° C.

2 Claims, No Drawings

PROCESS FOR THE PREPARATION OF CELLULOSE ALKYL ETHERS

Cellulose ethers such as methyl cellulose and ethyl cellulose are products which are used to a great extent. These cellulose ethers were hitherto produced by reacting them in a first stage with a more or less concentrated aqueous solution of an alkali hydroxide, in particular sodium hydroxide to form an alkali salt of cellulose (so-called alkali cellulose) which was then reacted with the halide of the alkyl such as methyl chloride to be introduced for preparing methyl cellulose. The problem with this process lies in the fact that both stages of the reaction are strongly exothermic and the cellulose, like its alkali salts, is easily decomposed during the process. Furthermore, they continually react in a heterogeneous reaction bed owing to the size of the polymeric molecule, thus increasing the danger of uncontrolled over-reaction. One of the considerable problems with the preparation of cellulose ethers which could not be overcome satisfactorily, therefore lies in the uniform temperature control in particular in the alkalization stage, thus resulting in the formation of inhomogeneous products both with regard to the degree of alkalization and with regard to the molecule size of the polymeric cellulose molecule, owing to the partial decomposition.

There are already various processes for preparing the lower alkyl ethers of cellulose which are always carried out in two separate stages owing to the various requirements with regard to the thermal control of the two reactions. In these processes, aqueous soda lye is used exclusively for alkalizing the cellulose. Some processes are carried out with lye concentrations of between 18 and 30% by weight, as for example in the so-called submerged pressure alkalization process or mashing alkalization process. The cellulose products alkalized in this way contain a large amount of water and this is disadvantageous in the subsequent reaction with the alkyl halide and for the economy of the process. There are also processes in which the cellulose is reacted with a more strongly concentrated alkali, for example with 50% aqueous soda lye. In order to obtain a product which is alkalized as uniformly as possible, finely ground cellulose must be used as starting material and the concentrated lye must also be applied to the finely ground cellulose product by means of special spraying apparatus, so that great things must be expected from the spraying apparatus, since uniformly reacted alkalization products are not formed if the highly concentrated alkali is not distributed uniformly. When using highly concentrated alkali, it is also more difficult to control the temperature of the exothermic alkalization reaction so that a reflux condenser is required for increased heat elimination.

When preparing other cellulose products such as carboxy methyl cellulose, when the cellulose is also alkalized in a first stage, the thermal control of the reaction between the cellulose and concentrated alkali have been improved by working in the presence of lower primary alcohols. In this case, the alcohol serves as a dispersant for the ceoncentrated alkali in the cellulose product to be reacted which may be more readily separated again in comparison to water. When the alkali cellulose is further processed to form cellulose ethers, the alcohol must however substantially be removed before the reaction is continued, otherwise ether products are formed to an undesirable extent in addition to the cellulose ethers as a result of the reaction of the alcohol with the lower alkyl halide.

It has accordingly been found that the desired cellulose ethers may be prepared in an extremely simple and fast manner with the formation of homogeneous products by reacting the cellulose with the concentrated or substantially water-free alkali hydroxide in a positive mixer having a fast-running mixing appliance and mixing container with adjustable internal pressure and cooling of the internal wall and in the presence of a limited excess of the lower alkyl halide to be used and by adjusting the pressure in the reaction vessel and the cooling of the latter while fast-running the mixing appliance in such a way that the alkyl halide, in particular an alkyl chloride, boils at a temperature in the range of from 15° to 40° C., so that the reaction heat liberated during alkalization is substantially absorbed by evaporation of the alkyl halide and the evaporated alkyl halide is recondensed on the cooled wall of the reaction vessel. Once the alkalization of the cellulose has ended, the temperature of the reaction mixture which is under pressure in some case only needs to be raised in such a way that the alkali cellulose reacts with the lower alkyl halide so that the entire preparation process may be carried out in a single reaction vessel.

Surprisingly, the alkali hydroxide does not react with the alkyl halide in this temperature range. Moreover, the cellulose does not decompose. In spite of the heterogeneity of the reaction mixture, the temperature control is perfect and a very homogeneous cellulose ether product is formed, indeed independently of whether a coarse-particled, fibrous or a specially crushed cellulose product is used as starting material.

The process according to the invention for preparing non-ionogenic cellulose ethers by reacting cellulose with alkali hydroxide and subsequently reacting the alkali cellulose with a $C_1$–$C_4$-lower alkyl halide is thus characterised in that the cellulose is mixed with the lower alkyl halide in a quantity corresponding to from 0.5 to 4, preferably from 2 to 4 parts by weight of lower alkyl halide to 1 part by weight of cellulose in a positive mixer having a fast-running mixing appliance and mixing container with adjustable internal pressure and cooling of the internal wall, and in that the alkali hydroxide is added in a highly concentrated form or in a substantially water-free, finely divided state and the pressure in the reaction vessel is regulated with simultaneous cooling and fast operation of the mixing appliance in such a way that the temperature of the reaction mixture remains in the range of from 15° to 40° C. and after alkalization, the temperature of the reaction mixture, at raised pressure in some cases, rises to 50° to 100° C. and the temperature is maintained in this higher range until the end of the reaction is shown by a drop in the temperature. The cellulose is advantageously reacted with the alkali hydroxide in such a way that the reaction mixture is maintained in a temperature range of from 20° to 35° C.

It has proved particularly advantageous to carry out the reaction in a fast-running positive mixer having a container with adjustable internal pressure and cooling of the internal wall, for example in a plough share mixer with choppers made by the company Gebrüder Lödige Maschinenbaugesellschaft mbH of Paderborn/Westphalia Federal Republic of Germany. The process according to the invention enables the former two reactions stages carried out in separate reaction vessels and the associated high costs for equipment to be avoided and leads to more homogeneous products in shorter reaction periods. When using fast-running positive mixers, the cellulose is introduced into the mixing container, the required quantity of lower alkyl halide is added and the alkali hydroxide is added after uniform distribution. If methyl chloride for example is used for preparing methyl cellulose as lower alkyl halide, a slightly raised pressure should be maintained so that the methyl chloride boils in the range of from 20° to 35° C. The reaction heat liberated when the cellulose reacts with the alkali hydroxide is substantially absorbed by the evaporation of the methyl chloride and is led off uniformly. The evaporating methyl chloride is continuously recondensed by cooling the internal wall and the reaction mixture is recycled. When using other lower alkyl halides, it is important that the pressure in the mixing container is always regulated in such a way that the boiling point of the alkyl halide lies in the range of from about 15° to about 40° C. preferably from about 20° to about 35° C.

When a drop in the temperature of the product to be mixed shows that the alkalization of the cellulose has ended, it is sufficient to raise the temperature slightly in the process according to the invention so that the reaction mixture is heated to a temperature in the range of about 50° to 100° C. The etherification of the alkali cellulose now begins. The reaction heat formed now is led off by cooling.

By applying the process according to the invention and in particular by using fast-running positive-mixers with adjustable internal pressure and cooling of the internal wall, in accordance with the invention, not only are particularly homogeneous reaction products obtained but they are also obtained within considerably reduced reaction periods. Even in industrial-scale preparations, only about 4 hours are required for reacting the cellulose to cellulose ether with high degrees of etherification, whereas in the previously known processes, at least 8 hours were required and in addition these processes were carried out in two stages.

The present invention is illustrated by the following embodiment.

EXAMPLE 1

Preparation of methyl cellulose

A plough share mixer with fast-running choppers made by the company Gebrüder Lödige Maschinenbaugesellschaft mbH of the DRUVATHERM type, the mixing container of which has a gross volume of 20 cbm is filled with 2.5 $t$ of coarsely crushed cellulose. The reactor is then sealed and evacuated to about 50 Torr, brought to normal pressure with nitrogen and evacuated again. 4000 kg of $CH_3Cl$ are subsequently added when the machine is running whereby a pressure of about 6 bars, is adjusted in the reactor. 2000 kg of a 50% aqueous solution of NaOH are now added with the machine running. The period for addition amounts to 10 minutes. During this period, the reactor is cooled via the double jacket of the mixing container in order to lead off the heat produced (mixing, wetting and reaction heat).

At coolant temperatures of 10° C., the temperature of the mixture in the reactor may be maintained within the desired range of from 20° to 25° C. without a reflux condensor. Alkalization of the cellulose lasts for about 60 minutes.

After alkalizing the cellulose, the charge is heated to from 70° to 80° C. with a continuously running machine and etherification is thus initiated. The pressure in the reactor is now 22 bars. The reaction lasts for about 60 minutes.

Unreacted methyl chloride is separated by applying a vacuum so that the cooled and separated cellulose ether product is simultaneously recovered. After pressure compensation in the mixing container with $N_2$, the cellulose ether is ready for use. Degree of substitution: 1.5 methoxy groups per glucose group.

The total period for charging, calculated from when the reactor is filled with cellulose until emptying is complete amounts to about 4 hours.

EXAMPLE 2

Preparation of ethyl cellulose

A LÖDIGE-DRUVATHERM reactor having a gross volume of 25 cbm is filled with 3 $t$ of coarsely crushed cellulose. After evacuation to 50 Torr, pressure compensation with $N_2$ and further evacuation, 5000 kg of ethyl chloride are added with machine running so that the pressure in the reactor is adjusted to about 2 bars. 4500 kg of a 50% aqueous NaOH solution are subsequently added, also with machine running. The period for addition amounts to about 20 minutes. By cooling the reactor with water at 10° C., the temperature of the reaction mixture may be maintained in the desired range of from 25° to 30° C. without difficulty. At this temperature, alkalization of the cellulose lasts 60 minutes.

The charge is subsequently heated to from 100° to 110° C. with machine still running and maintained at this pressure with running machine for 90 minutes. The pressure in the reactor now amounts to about 16 bars.

Unreacted alkyl chloride is separated by applying a vacuum so that the cellulose ether product is simultaneously cooled and the ethyl chloride is recovered, separated from the mixing container by means of a suitable cooling apparatus.

After pressure compensation in the mixing container by adding $N_2$, the cellulose ethyl ether product is emptied, ready for use. Degree of substitution: 2.5 ethoxy groups per glucose group.

The total duration of a charge including charging and emptying lasts about 4½ hours in the DRUVATHERM reactor.

What we claim is:

1. Process for preparing cellulose alkyl ethers by reacting cellulose with an alkali hydroxide and subsequently reacting the alkali cellulose with a $C_1$–$C_4$-lower alkyl halide, comprising intimately mixing the cellulose mixed with the lower alkyl halide in a quantity corresponding to from 0.5 to 4 parts by weight of lower alkyl halide to 1 part by weight of cellulose in a positive mixer having a fast-running mixing appliance and a container with adjustable internal pressure and means for cooling of the internal container wall, adding the alkali hydroxide in a concentrated aqueous solution or in a substantially water-free and finely divided state to the container, adjusting the pressure of the container with cooling in such a way that the temperature of the reaction mixture remains in the range of from 15° to 40° C., and raising the temperature to from 50° to 100° C. once alkalization is ended.

2. Process according to claim 1, wherein the pressure in the container is adjusted with cooling such that the temperature of the reaction mixture remains in the range of from 20° to 35° C.

* * * * *